(12) United States Patent
Salter et al.

(10) Patent No.: US 9,739,266 B2
(45) Date of Patent: Aug. 22, 2017

(54) FLUID-WORKING MACHINE AND METHOD OF OPERATING A FLUID-WORKING MACHINE

(75) Inventors: Stephen Hugh Salter, Edinburgh (GB); William Hugh Salvin Rampen, Edinburgh (GB); Michael Richard Fielding, Linlithgow (GB); Niall James Caldwell, Edinburgh (GB); Stephen Michael Laird, Edinburgh (GB); Pierre Robert Joly, Edinburgh (GB)

(73) Assignee: ARTEMIS INTELLIGENT POWER LIMITED, Loanhead (GB)

( * ) Notice: Subject to any disclaimer, the term of this patent is extended or adjusted under 35 U.S.C. 154(b) by 1029 days.

(21) Appl. No.: 13/320,127

(22) PCT Filed: Feb. 23, 2011

(86) PCT No.: PCT/GB2011/050354
§ 371 (c)(1),
(2), (4) Date: Nov. 11, 2011

(87) PCT Pub. No.: WO2011/104543
PCT Pub. Date: Sep. 1, 2011

(65) Prior Publication Data
US 2012/0059523 A1 Mar. 8, 2012

(30) Foreign Application Priority Data
Feb. 23, 2010 (GB) .................. 1003000.5

(51) Int. Cl.
*F03D 9/00* (2016.01)
*F03D 9/25* (2016.01)

(52) U.S. Cl.
CPC ............. *F03D 9/002* (2013.01); *F03D 9/25* (2016.05); *F05B 2260/406* (2013.01); *Y02E 10/725* (2013.01)

(58) Field of Classification Search
CPC .... F04B 1/06; F04B 49/06; F04B 7/00; F04B 1/053; F04B 1/0531; F04B 7/0076;
(Continued)

(56) References Cited

U.S. PATENT DOCUMENTS 3,928,968 A  12/1975  Becker et al.
4,496,846 A  1/1985  Parkins
(Continued)

FOREIGN PATENT DOCUMENTS

CN  2849495 Y  12/2006
DE  2916490  11/1980
(Continued)

OTHER PUBLICATIONS

W.H.S. Rampen, et al., "Constant Pressure Control of the Digital Displacement Hydraulic Piston Pump", Fourth Bath International Fluid Power Workshop, Bath, Sep. 18-20, 1991.

*Primary Examiner* — Theodore Stigell
*Assistant Examiner* — Jon Hoffmann
(74) *Attorney, Agent, or Firm* — Hauptman Ham, LLP (57) ABSTRACT

The present invention relates to a method of operating a fluid-working machine wherein the volume of working fluid displaced each cycle is selectable and wherein the volume of working fluid displaced by a first working chamber takes into account the suitability of the working chamber to displace fluid. The invention extends in further aspects to power absorbing structures such as renewable energy devices comprising such fluid working machines. The invention allows the operation of fluid working machines and power absorbing structures which are more long lived.

19 Claims, 5 Drawing Sheets

(58) Field of Classification Search
CPC ........ F04B 49/22; F04B 49/24; F04B 49/065;
F04B 51/00; F04B 53/1082; F03D 9/002;
F05B 2260/46; F17D 3/00; F01B 31/00;
Y02E 10/725; G06F 19/00
USPC ........ 417/269, 270, 273; 91/476, 163; 137/2
See application file for complete search history.

(56) References Cited

U.S. PATENT DOCUMENTS

| | | | |
|---|---|---|---|
| 4,496,847 | A | 1/1985 | Parkins |
| 4,556,026 | A | 12/1985 | Masuda et al. |
| 4,606,312 | A | 8/1986 | Fujii et al. |
| 4,965,513 | A | 10/1990 | Eissenberg et al. |
| 5,046,926 | A * | 9/1991 | Deininger et al. ............ 417/216 |
| 5,190,446 | A | 3/1993 | Rampen et al. |
| 5,201,294 | A | 4/1993 | Osuka |
| 5,259,738 | A | 11/1993 | Rampen et al. |
| 5,263,365 | A | 11/1993 | Kantschar et al. |
| 5,439,355 | A | 8/1995 | Barker et al. |
| 5,445,019 | A | 8/1995 | Chui et al. |
| 5,456,581 | A | 10/1995 | Jokela et al. |
| 5,492,099 | A | 2/1996 | Maddock |
| 5,564,391 | A | 10/1996 | Barnes et al. |
| 5,584,266 | A | 12/1996 | Ishigami et al. |
| 5,657,681 | A | 8/1997 | Henricson |
| 5,711,273 | A | 1/1998 | Barnes et al. |
| 5,723,780 | A | 3/1998 | Miwa et al. |
| 5,737,994 | A | 4/1998 | Escobosa |
| 5,773,716 | A | 6/1998 | Antonioli et al. |
| 5,954,032 | A | 9/1999 | Augustin et al. |
| 6,055,851 | A | 5/2000 | Furuno et al. |
| 6,092,370 | A | 7/2000 | Raghavan et al. |
| 6,293,251 | B1 | 9/2001 | Hemmerlein et al. |
| 6,474,292 | B1 | 11/2002 | Frenz et al. |
| 6,478,547 | B1 | 11/2002 | Savard et al. |
| 6,681,571 | B2 * | 1/2004 | Bailey et al. .................... 60/489 |
| 6,829,542 | B1 | 12/2004 | Reynolds et al. |
| 7,241,615 | B2 * | 7/2007 | St. Lawrence ............ B09B 3/00 210/610 |
| 2001/0032031 | A1 | 10/2001 | Ufheil et al. |
| 2002/0062682 | A1 | 5/2002 | Kumpfmueller |
| 2003/0144746 | A1 * | 7/2003 | Hsiung .................. G05B 15/02 700/28 |
| 2003/0144818 | A1 * | 7/2003 | Kasuya .................... F04B 23/06 702/185 |
| 2004/0158419 | A1 | 8/2004 | Pearson et al. |
| 2004/0226346 | A1 | 11/2004 | Benken et al. |
| 2004/0231348 | A1 | 11/2004 | Kawaguchi et al. |
| 2005/0118033 | A1 | 6/2005 | Schneider |
| 2005/0238503 | A1 | 10/2005 | Rush et al. |
| 2005/0257618 | A1 | 11/2005 | Boken |
| 2006/0039795 | A1 * | 2/2006 | Stein et al. ....................... 417/1 |
| 2006/0184264 | A1 * | 8/2006 | Willis ................ G05B 19/4184 700/108 |
| 2006/0219632 | A1 * | 10/2006 | Bradford ................ C02F 3/006 210/614 |
| 2007/0125343 | A1 | 6/2007 | Hayakawa |
| 2007/0227345 | A1 | 10/2007 | Ruiz Martinez |
| 2007/0258832 | A1 | 11/2007 | Caldwell et al. |
| 2008/0015806 | A1 | 1/2008 | Stegmann et al. |
| 2008/0121290 | A1 | 5/2008 | Pape et al. |
| 2008/0190176 | A1 | 8/2008 | Muller et al. |
| 2008/0206073 | A1 | 8/2008 | Rampen et al. |
| 2008/0249699 | A1 | 10/2008 | Wolber et al. |
| 2009/0101101 | A1 | 4/2009 | Iwamoto |
| 2009/0210120 | A1 | 8/2009 | Stein et al. |
| 2009/0229455 | A1 | 9/2009 | Eichner |
| 2009/0320502 | A1 * | 12/2009 | Kurihara ................ F25B 9/008 62/78 |
| 2010/0183448 | A1 | 7/2010 | Leugemors et al. |
| 2010/0186402 | A1 | 7/2010 | Ariga et al. |
| 2010/0243067 | A1 * | 9/2010 | Stein ...................... F04B 49/03 137/14 |
| 2010/0296948 | A1 * | 11/2010 | Kuttler .................... F04B 49/22 417/53 |
| 2010/0303638 | A1 | 12/2010 | Kuttler et al. |
| 2010/0303657 | A1 | 12/2010 | Kuttler et al. |
| 2011/0123354 | A1 | 5/2011 | Stein et al. |
| 2011/0226342 | A1 * | 9/2011 | Stein et al. ....................... 137/2 |
| 2011/0268590 | A1 | 11/2011 | Stein et al. |
| 2007/0025832 | A1 | 1/2013 | Noorchashm et al. |

FOREIGN PATENT DOCUMENTS

| | | | |
|---|---|---|---|
| DE | 3244738 | | 6/1984 |
| DE | 19625947 | | 9/1997 |
| DE | 19947570 | | 4/2001 |
| DE | 10334817 | | 10/2005 |
| EP | 0361927 | | 9/1989 |
| EP | 0471098 | A1 | 2/1992 |
| EP | 0494236 | | 12/1995 |
| EP | 0 928 849 | A2 | 7/1999 |
| EP | 1319835 | A2 | 6/2003 |
| EP | 1319836 | | 6/2003 |
| EP | 1537333 | | 6/2006 |
| EP | 1674365 | | 6/2006 |
| EP | 2055943 | | 5/2009 |
| EP | 2055945 | | 5/2009 |
| EP | 2055946 | | 5/2009 |
| EP | 2055947 | | 5/2009 |
| GB | 2070199 | | 12/1980 |
| GB | 2314412 | | 6/1996 |
| GB | 2459520 | | 6/2008 |
| GB | WO 2009056141 | A1 * | 5/2009 ............ F04B 7/0076 |
| GB | 2459520 | A * | 10/2009 ................ F04B 7/00 |
| JP | 52-144568 | | 12/1977 |
| JP | 62-20681 | | 1/1987 |
| JP | 6108976 | | 4/1994 |
| JP | 10-54371 | | 2/1998 |
| JP | 11117875 | | 4/1999 |
| JP | 2002041143 | | 2/2002 |
| JP | 2002-242849 | A | 8/2002 |
| JP | 2003314460 | | 11/2003 |
| JP | 2007092582 | | 4/2007 |
| JP | 2007-534886 | | 11/2007 |
| KR | 20000046874 | | 7/2000 |
| RU | 2344320 | C1 | 1/2009 |
| WO | 9105163 | | 4/1991 |
| WO | 2004025122 | | 3/2004 |
| WO | 2005095800 | | 10/2005 |
| WO | 2007068447 | | 6/2007 |
| WO | 2007082637 | | 7/2007 |
| WO | 2007088380 | | 8/2007 |
| WO | WO 2007088380 | A1 * | 8/2007 |
| WO | 2007099057 | | 9/2007 |
| WO | 2008009950 | | 1/2008 |
| WO | 2008012587 | | 1/2008 |
| WO | 2008025413 | | 3/2008 |
| WO | 2008046544 | | 4/2008 |
| WO | 2009153605 | | 12/2009 |
| WO | 2012-031066 | | 5/2012 |
| WO | 2012141623 | | 10/2012 |

* cited by examiner

FLUID-WORKING MACHINE AND METHOD OF OPERATING A FLUID-WORKING MACHINE

RELATED APPLICATIONS

The present application is a National Phase of International Application Number PCT/GB2011/050354, filed Feb. 23, 2010 and claims priority from, British Application Number 1003000.5, filed Feb. 23, 2010.

FIELD OF THE INVENTION

The present invention relates to a method of operating a fluid-working machine, a fluid-working machine, computer program code and a power absorbing structure. The present invention may more particularly relate to a hydraulic pump or motor having control of individual working chambers.

BACKGROUND TO THE INVENTION

In the most common positive displacement hydraulic machines the fluid chambers undergo cyclical variations in volume following a roughly sinusoidal function. It is known from EP0361927 that a chamber can be left to idle by holding an electromagnetically actuated valve, between the working chamber and the low-pressure source, in the open condition. Thus the output of such synthetically commutated machines is varied through the action of first filling each working chamber with liquid, then deciding whether to reject the liquid back to the low-pressure source or to pump it at pressure to the output manifold. Pumping the liquid back to the low-pressure source means that a very small amount of power needs to be expended, during the time that a working chamber is idle, whilst still allowing the working chambers to become productive with a minimum latency period. EP0494236 introduced an additional operating mode which allows the use of the hydraulic machine in a motoring cycle where torque is applied to the rotating shaft, thus allowing a controllable bi-directional energy flow.

WO/2008/012587 introduced a method to adjust the working chamber cycles of such machines so as to react very rapidly to events by adding or subtracting torque (or flow) from the machine's shaft (or outlets). The adjustment causes additional or lesser torque (or flow) compared to the original and underlying demanded torque (or flow).

The designer wishing to use machines of the aforementioned kind (for example due to their unsurpassed efficiency and controllability) faces new challenges which are not found when using machines in which every working chamber is active each revolution and to largely the same degree as each other. These challenges include differential wear, shaft load balancing, and resonance. All of these challenges are caused by the sometimes irregular displacement of fluid and application of torque to the rotating shaft and are described in more detail in the following paragraphs.

Differential wear: over time, synthetically commutated machines may use some cylinders statistically more often than others. This is particularly a problem when certain cylinders are connected at times to different working functions, for example as described in WO/2008/009950. This leads to a reduction in the lifetime of the machine, as favoured working chambers may fatigue or wear faster than infrequently used ones.

Shaft load balancing: many conventional fluid working machines are designed so that radial forces applied by the many simultaneously active working chambers to the rotating shaft are balanced or offset against each other. However, where some working chambers are disabled as in synthetically commutated machines, it is possible for very high unbalanced forces to increase wear or even damage the bearings holding the shaft, or even to bend the shaft itself.

Resonance: applications where the irregular application of torque to a shaft is undesirable include transmissions such as vehicle and wind turbine transmissions, while applications where irregular displacement of fluid is undesirable include those with working functions such as mobile and fixed hydraulically driven materials handling equipment (forklifts, excavators and the like). In these applications, irregularity can excite or exacerbate mechanical resonances inherent in the structures and parts driven by or driving the fluid working machine. For example, irregular drive of a wheel might induce undue torsional vibration at the natural frequency of an axle, or the irregular force from a so-driven wheel reacting against the ground may induce undue structural vibration at the natural frequency of parts of a vehicle chassis. In material handling equipment the irregularity of displacement of fluid into a hydraulic actuator might induce undue vibration at the natural frequency of a forklift's tower or the extendable arm of an excavator, for example.

From the above it will be appreciated that there are numerous applications in which careful control of the output torque or fluid displacement from a synthetically commutated fluid working machine is very important. The present invention aims to address various of the problems described above.

SUMMARY OF THE INVENTION

In a first aspect, the invention provides a method of operating a fluid working machine according to claim 1, preferred or optional features of the invention being set out in the dependent claims.

The selection of the volume of working fluid may be achieved by operating an actuator in dependence on a control signal received from a control unit, for example. However, the present invention concerns varying the amount of fluid displaced during individual cycles of working chamber volume according to a secondary need (that is to say, a need other than meeting the demand indicated by the received demand signal), while continuing to provide a time-averaged flow which meets the demand indicated by the received demand signal. Thus, the method may comprise selecting, from amongst a plurality of combinations of fluid displacement by individual working chambers which would give the same total flow, a combination of fluid displacements by individual working chambers which meets a secondary need, and is therefore more or most suitable.

The taking into account of the suitability of working chambers when selecting the volume of working fluid to be displaced by a working chamber enables the fluid-working machine to displace an appropriate amount of fluid to meet a working function, responsive to a received demand signal, but to also keep in balance one or more additional considerations which would not be possible if the suitability of working chambers was not taken into account. Typically the peak to peak flow and shaft torque ripple produced by the fluid working machine increase when the suitability is taken into account when selecting the volume of working fluid to be displaced by a working chamber. This is normally considered to be an unfavourable attribute, but surprisingly we have found that there are some circumstances where the increased ripple is beneficial, if the working chambers are selected according to both the demand and the secondary need.

The suitability of a working chamber (e.g. the first working chamber) to displace fluid to carry out the working function is typically related to a mechanical consideration (not the time averaged flow of fluid). A mechanical consideration is typically the effect on a moveable mechanical component of a force applied to it by the working fluid displaced by the fluid working machine. For example, a mechanical consideration includes wear of one or more components of the fluid working machine, net forces acting on the machine as a result of the displacement of fluid by the working chambers, or resonances within a mechanical component driven by or driving the fluid working machine. The suitability of a working chamber may be related to a mechanical consideration related to the expected lifetime or time between maintenance requirements of the fluid working machine or one or more components thereof.

The suitability of a working chamber may include at least one suitability measure predictive of the effect on a secondary parameter of selecting the working chamber for an active cycle, for example. The demand signal may be a demand for time-averaged fluid delivery, for example, and the secondary parameter may be a requirement for the timing of the individual deliveries making up the time-averaged fluid delivery. The secondary parameter may be a mechanical parameter relating to a mechanical consideration, for example, a parameter concerning the wear of one or more components of the fluid working machine, the net forces within the fluid working machine, or a measure of mechanical resonance in a mechanical component driven by or driving the fluid working machine.

The method preferably comprises receiving a current value of one or more mechanical parameters related to the mechanical consideration. A current value of a mechanical parameter may be a measured mechanical parameter or a calculated mechanical parameter. Typically suitability of a working chamber is determined by reference to the current value of the one or more mechanical parameters. Typically suitability of a working chamber is determined with reference to one, some or all of the predicted future value of the one or more mechanical parameters, the predicted future value taking into account the current value of the one or more mechanical parameters and the effect on the mechanical consideration of selecting the working chamber for an active cycle, for example. Typically the method comprises selecting the suitability of a working chamber with reference to the predicted future value of the one or more mechanical parameters, the predicted future value taking into account the current value of the one or more mechanical parameters and the effect on the mechanical consideration of selecting the working chamber for an active cycle, for example.

Typically, the suitability of a first working chamber is higher than that of a second working chamber if selecting the first working chamber for an active cycle, for example, will have a greater effect on bringing the predicted future value of the one or more mechanical parameters towards a desirable value thereof, compared to selecting the second working chamber for an active cycle, for example. A desirable value of the predicted future value of the one or more mechanical parameters is typically one in which the future values of a plurality of mechanical parameters are balanced.

Mechanical parameters include for example the number of active cycles carried out by individual working chambers and their valves; a measure of working chamber or valve wear, typically weighted by the number of active cycles and the contribution of the current conditions to wear (for example the pressure in the working chamber during the active cycle); the force vectors applied by working chambers in use to the shaft driving them; and the relative positions, velocities or accelerations (including angular positions, velocities or accelerations) of mechanical structures driven by or driving the working function.

It may be that there is a plurality of mechanical parameters and that the method comprises determining the suitability of a working chamber with reference to the effect on the future values of the plurality of mechanical parameters. In particular, the method may comprise determining the suitability of a working chamber such that a higher suitability is determined when the future values of the plurality of mechanical parameters are balanced. The method preferably comprises selecting that working chamber or those working chambers, for example for active cycles, that restore balance in or increase the balance between the current or future values of the mechanical parameters. Thus, the method preferably comprises selecting that working chamber or those working chambers, for example for active cycles, that counteracts (or compensates) imbalance between the current or future values of the mechanical parameters.

Balanced, with respect to a plurality of mechanical parameters, typically means that the parameters are related to each other in a desired way. They are thus similar to each other, or their vectors sum together to zero, or they are related to each other in desired ratios, depending on the application.

Typically suitability to carry out the working function is determined at least once per cycle of working chamber volume, for each working chamber.

The controller may actively control the said electronically controllable valves (for example by outputting control signals), in phased relationship to cycles of working chamber volume, to regulate the time-averaged displacement of the working chambers, responsive to the received demand signal.

The fluid working machine may function only as a motor, or only as a pump. Alternatively, the fluid working machine may function as either a motor or a pump in alternative operating modes.

Preferably, each working chamber is operable on each cycle of working chamber volume to carry out an active cycle in which the chamber makes a net displacement of working fluid or an idle cycle in which the chamber makes substantially no net displacement of working fluid. It may be that each working chamber is operable to displace one of a plurality of volumes of working fluid (for example, a range of volumes of working fluid) during an active cycle. The said range of volumes may be discontinuous, for example, the range of volumes of working fluid may comprise a range extending from a first minimum of substantially no net fluid displacement, to a first maximum of at most 25% or 40% of the maximum net fluid displacement of a working chamber, and then from a second minimum of at least 60% or 75% of the maximum net fluid displacement of a working chamber, to a second maximum in the region of 100% of the maximum net fluid displacement of a working chamber. This may occur where, for example, the operating working fluid pressure is sufficiently high that it is not possible to open or close valves in the middle of expansion or contraction strokes of working chamber volume, or the fluid flow is sufficiently high that operating with a continuous range of volumes would be damaging to the working chamber, the valves of the working chamber, or other parts of the fluid working machine.

Preferably the method comprises also taking into account the relative suitability of at least one second working chamber or chambers to displace fluid to carry out the working function. The suitability of the at least one second working chamber may be the suitability of the second working chamber during a cycle of working chamber volume shortly after, shortly before, simultaneous to, in phase with, or contemporaneous to the cycle of working chamber volume of the first working chamber. Shortly after preferably means that the cycle of working chamber volume of the second working chamber begins before the cycle of working chamber volume of the first working chamber ends. Shortly before preferably means that the cycle of working chamber volume of the second working chamber ends before the cycle of working chamber volume of the first working chamber begins. Contemporaneous to preferably means that suitability is determined for cycles of working chamber volume of the first and second working chambers which overlap in time.

Preferably the fluid-working machine is operable such that, on at least some occasions, the first working chamber carries out an active cycle instead of an idle cycle as a result of its relative suitability compared to at least one second working chamber. Thus, the method may comprise determining whether the at least one second working chamber is unsuitable and causing the first working chamber to execute an active cycle instead of an idle cycle responsive thereto. Preferably the volume of working fluid displaced by the at least one second working chambers is selected to carry out the working function responsive to the received demand signal, taking into account the selected volume of working fluid displaced by said first working chamber. It may be that the volume of working fluid displaced by a plurality of second working chambers is selected to carry out the working function responsive to the received demand signal, taking into account the selected volume of working fluid displaced by said first working chamber. It may be that the volume of working fluid displaced by the at least one second working chambers is selected to carry out the working function exactly responsive to the received demand signal.

The controller may compute or otherwise process an algorithm, which algorithm takes into account a plurality of input data including suitability data, wherein for at least some input data including suitability data indicative that the second working chamber is more suitable to carry out the working function than the first working chamber, the algorithm is operable to determine that the first working chamber should not carry out an active cycle, and for the same input data except that the suitability data is indicative that the second working chamber is less suitable to carry out the working function than the first working chamber, the algorithm is operable to determine that the first working chamber should carry out an active cycle. For example, the controller may execute a stored program (the stored program encoding the algorithm) and thereby process the algorithm. In other words, the controller may receive a plurality of input data, and process the input data to determine whether or not the first working chamber should carry out an active cycle, said processing further comprising processing suitability data associated with the first working chamber and a second working chamber to determine the relative suitability of the first working chamber relative to the second.

The controller may comprise a phase input for receiving a phase signal indicative of the phase of volume cycles of working chambers of a fluid working machine. The phase signal may be received from a phase sensor, for example an optical, magnetic or inductive phase sensor. The phase sensor may sense the phase of a crankshaft (which may be an eccentric crankshaft) and the controller may infer the working chamber phase from the sensed eccentric crankshaft phase.

Preferably, when the demand indicated by the received demand signal is sufficiently low, one or more working chambers operable to displace fluid to carry out the working function is redundant during one or more cycles of working chamber volume, that is to say, if the working chamber was not present or was not operating, the fluid-working machine could anyway displace sufficient fluid to meet the demand without changing the overall frequency of active cycles of working chamber volume.

Preferably, when the demand indicated by the received demand signal is sufficiently low, the selected volume of fluid displaced by at least one of the working chambers which are available to carry out the working function is substantially zero for at least some cycles of working chamber volume. In some embodiments, when the demand indicated by the received demand signal is sufficiently low, at least one of the working chambers which are available to carry out the working function carries out an idle cycle for at least some cycles of working chamber volume. In some embodiments, wherein the working chambers are operable to displace one of a plurality of volumes of working fluid, when the demand indicated by the received demand signal is sufficiently low, the selected volume of fluid displaced by at least one of the working chambers which are available to carry out the working function is less than the maximum volume of working fluid which the said at least one of the working chambers is operable to displace.

The received demand signal may indicate a desired volume of working fluid to be displaced (e.g. received or output) to fulfil a working function. The received demand signal may indicate a desired output or input pressure, for example. The received demand signal may indicate a desired rate to displace fluid to fulfil a working function. A fluid response sensor may be provided to monitor a property of received or output fluid, for example, the pressure of received or output fluid, or the rate of displacement of received or output fluid, and to provide a fluid response signal. The controller may compare the fluid response signal and the received demand signal to select the volume of working fluid displaced by one or more said working chambers on each cycle of working chamber volume, for example to perform closed loop control.

The volume cycles of the first and second working chambers may be synchronised (in phase), or the first may be before the second, or the second may be before the first.

In embodiments in which suitability is determined by the historical amount of use of a working chamber, a measurement or prediction of use preferably includes a weighting factor determined from one or more operating parameters at the time of use. Said operating parameters may include the timing of the opening or closing of the at least one valve, pressure, temperature and/or fluid condition (including water content, air content, age).

In embodiments in which the suitability is determined by the measurement or prediction of the net force applied to a rotatable shaft of said fluid working machine by fluid-pressurised working chambers, the method preferably comprises using measurements from one or more pressure sensors in fluid communication with the working fluid in the plurality working chambers, to calculate the net force. Preferably the net force is predicted or measured more than once per working chamber volume cycle. Preferably the method comprises predicting the net force at a point falling within the next working chamber volume cycle. Preferably the method comprises, before the beginning of an upcoming cycle of working chamber volume of the first working chamber, making a prediction of the net force at a later point in the upcoming cycle. The net force is preferably a radial net force. A radial net force is one which acts perpendicular to the axis of rotation of the rotatable shaft. The net force may be a maximum net force, or may be an average net force, or may be some relative estimate of net force.

The calculation of net force preferably comprises using knowledge of the physical arrangement of the working chambers. The calculation of net force preferably comprises keeping a record of which working chambers are fluid-pressurised, which may include keeping a record of which working chambers are undertaking active cycles. The calculation of net force preferably includes taking into account non-fluid forces on the rotatable shaft. Non-fluid forces preferably include spring forces, inertial forces and gravitational forces. Net force can be calculated in any scale (including a non-linear scale) or in any units.

In embodiments where the suitability is determined by the measurement or prediction of the motion of a mechanical component, the suitability of each working chamber is determined from a prediction of the future motion of the mechanical component. Typically working chambers have higher suitability of the predicted future motion is smoothest, that is to say, has the lowest acceleration or the lowest jerk or some combination thereof.

The method may include determining the suitability of a group of working chambers, and determining the suitability of a single working chamber with reference to the suitability of said group. The suitability of a single working chamber may be determined with reference to the suitability of one or more groups of working chambers to which it belongs and to measures of suitability relating only to the single working chamber itself.

The invention extends in a second aspect to a fluid working machine comprising a controller and a plurality of working chambers of cyclically varying volume, each said working chamber operable to displace a volume of working fluid which is selectable by the controller on each cycle of working chamber volume, the controller operable to select the volume of working fluid displaced by one or more said working chambers on each cycle of working chamber volume to carry out a working function responsive to a received demand signal, operated in accordance with any of the methods described with reference to the first aspect.

The invention extends in a third aspect to computer program code which, when executed on a fluid working machine controller, operates the fluid working machine according to any of the methods described with reference to the first aspect.

The invention extends in a fourth aspect to a method of operating a power absorbing structure comprising at least one mechanical component and further comprising a fluid working machine itself comprising a plurality of working chambers of cyclically varying volume, each said working chamber operable to displace a volume of working fluid which is selectable for each cycle of working chamber volume, the method comprising selecting the volume of working fluid displaced by one or more said working chambers during each cycle of working chamber volume to carry out a working function responsive to a received demand signal, the method further including measuring or predicting the motion of the mechanical component and selecting the volume of working fluid displaced by a first working chamber during a cycle of working chamber volume taking into account the measured or predicted motion of the mechanical component under the influence of the fluid working machine.

By under the influence of is meant that the fluid working machine may drive the mechanical component or the mechanical component may drive the fluid working machine, or both at different times. The power absorbing structure preferably absorbs power from the surrounding environment. The power absorbing structure may absorb power from the fluid working machine. The power absorbing structure is preferably a renewable energy device and may be a wind or tidal turbine. The power absorbing structure may be a vehicle or the wheel or track of a vehicle. The fluid working machine may drive or be driven by more than one said mechanical component.

Mechanical components may include the rotatable shaft of the fluid working machine or the rotatable body of the fluid working machine, or may include components attached to said rotatable parts either directly or indirectly. Said motion may be an oscillatory motion, an acceleration and/or a velocity. Said motion may be a rotational motion, a linear motion, or a combination of one or more rotational and linear motions. The motion may be an absolute motion, by which is meant a motion of the mechanical component compared to an essentially fixed base. The motion may be a relative motion, by which is meant a motion of the mechanical component compared to a reference mechanical component which may itself be moving or movable. The method may comprise determining the suitability of a working chamber from mechanical conditions of the mechanical component consequent to the motion. Mechanical conditions may include stresses, strains or shapes, and may include dynamic stresses, strains or shapes.

The method may comprise calculating the future motion of the mechanical component. The method may comprise determining the suitability of a working chamber from the future motion of the mechanical component.

The invention extends in a fifth aspect to a power absorbing structure comprising at least one mechanical component and further comprising a fluid working machine, operable in accordance with the method of the fourth aspect. Preferably the power absorbing structure comprises sensors to determine the motion of the mechanical component. Preferably the motion of the mechanical component under the influence of the fluid working machine is predictable or measurable. Preferably the power absorbing structure comprises a computer for predicting the motion of the mechanical component under the influence of the fluid working machine.

The invention extends in a sixth aspect to a computer model of a power absorbing structure comprising at least one mechanical component and further comprising a fluid working machine itself comprising a plurality of working chambers of cyclically varying volume, each said working chamber operable to displace a volume of working fluid which is selectable for each cycle of working chamber volume to carry out a working function responsive to a received demand signal, said computer model being operable to predict the motion of said at least one mechanical component under the influence of the fluid working machine. The computer model may comprise a partial model of the fluid working machine, i.e. a model capable of simulating only some of the properties of the fluid working machine. Preferably the computer model can simulate the torque produced by the selected working chambers of the fluid working machine. The computer model may comprise a partial model of the mechanical component, i.e. a model capable of simulating only some of the properties of the mechanical component. Preferably the computer model can simulate the motion of the mechanical component under the influence of the fluid working machine. The computer model may comprise program code and data stored on a computer readable carrier. The computer model may comprise program code and data stored in memory in electronic communication with a processor.

In a further aspect of the invention there is provided a method of operating a fluid-working machine for a plurality of cycles of working chamber volume, the fluid-working machine comprising a plurality of working chambers of cyclically variable volume, each said working chamber being operable to displace a selectable volume of working fluid during each cycle (for example one of a first volume corresponding to an 'active' cycle and no net volume corresponding to an 'idle' cycle), and the method comprising: controlling the plurality of working chambers in aggregate so as to cause the total volume of working fluid displaced during each cycle to conform to a global demand function (for example to conform to a time-averaged demand signal, in terms of pressure, volume, or other appropriate measure, and/or a demand signal that may or may not vary over the course of a number of cycles); and controlling the plurality of working chambers individually in accordance with a suitability function that determines the suitability of (for example, determines a suitability value for, such as an absolute or relative value, which may for example be used as a threshold or used to modify an existing threshold so as to determine whether or not each working chamber is activated, such activation for example determining a choice of volume of working fluid to displace during a given cycle) each working chamber. A method such as this may for example relate to an arrangement where the time-average torque (or other appropriate measure) provided to a load may be varied according to a (global) demand but the choice of individual working chambers providing the instantaneous torque may be varied in time according to a secondary consideration. It will be appreciated that specific features and terms of the present aspect may differ from features of other aspects mentioned above; with regard to the description below, the skilled man will recognise that such features and terms are generally interchangeable and in some cases may be omitted (unless they are clearly indicated to be essential features of the invention) or added.

References above to making predictions may for example include the step of, or means for, processing a set of data representing measurements relevant to the prediction in accordance with an appropriate formula and outputting a prediction value representing the relevant prediction.

Preferred and optional features of the second through sixth aspects correspond to those described for the first aspect. Further variations and modifications may be made within the scope of the invention, as will present themselves to those skilled in the art.

DESCRIPTION OF THE DRAWINGS

An example embodiment of the present invention will now be illustrated with reference to the following Figures in which.

DETAILED DESCRIPTION OF AN EXAMPLE EMBODIMENT

Figure 1:
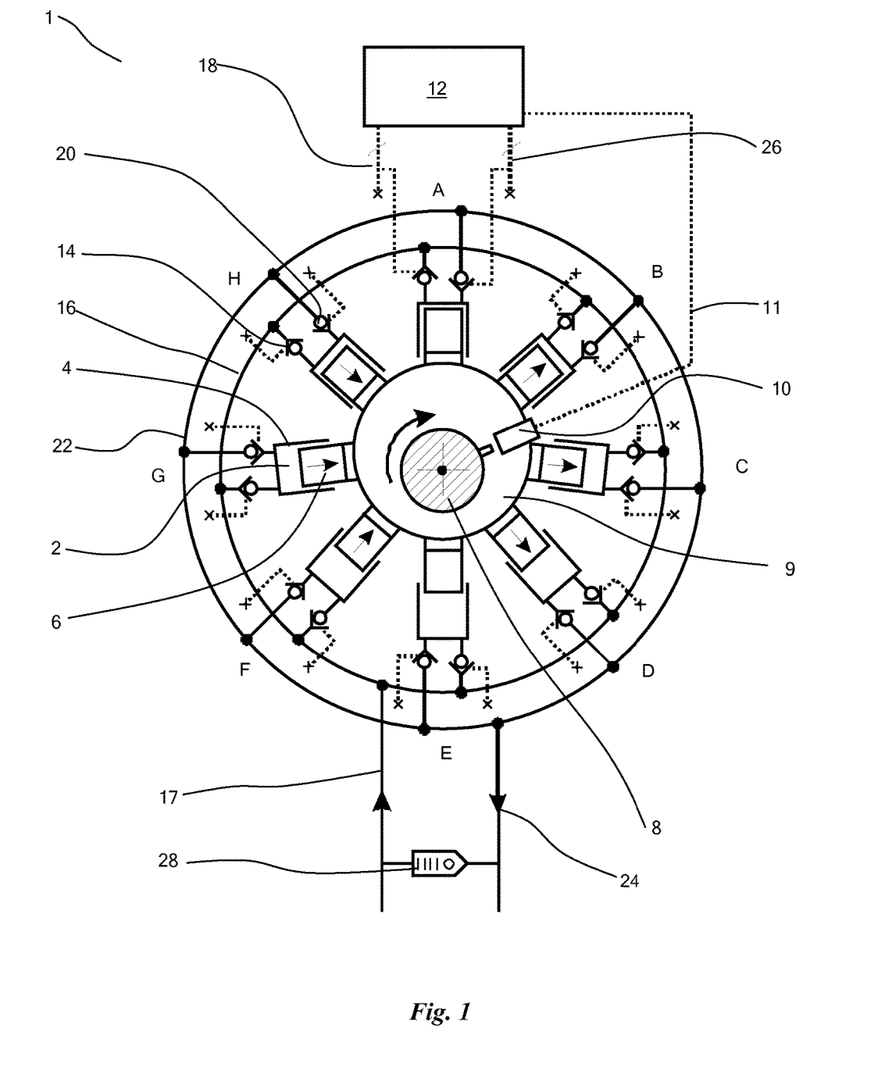
FIG. 1 shows a fluid working machine suitable for use with the invention.

FIG. 1 illustrates a fluid working machine in the form of a synthetically commutated hydraulic pump/motor 1 comprising a plurality of working chambers 2 (designated individually by letters A to H) which have volumes defined by the interior surfaces of cylinders 4 and pistons 6 which are driven from a rotatable crankshaft 8 by an eccentric cam 9 and which reciprocate within the cylinders to cyclically vary the volume of the working chambers. A shaft position and speed sensor 10 determines the instantaneous angular position and speed of rotation of the shaft, and through signal line 11 informs a controller 12, which enables the controller to determine the instantaneous phase of the cycles of each working chamber. The controller is typically a microprocessor or microcontroller which executes a stored program in use.

The working chambers are each associated with Low Pressure Valves (LPV) in the form of electronically actuated face-sealing poppet valves 14, which face inwards toward their associated working chamber and are operable to selectively seal off a channel extending from the working chamber to a low pressure manifold 16, which functions generally as a net source or sink of fluid in use and may connect one or several working chambers, or indeed all as is shown here, to a reservoir (not shown) through a low pressure port 17. The LPVs are normally open solenoid closed valves which open passively when the pressure within the working chamber is less than the pressure within the low pressure manifold, i.e. during an intake stroke, to bring the working chamber into fluid communication with the low pressure manifold, but are selectively closable under the active control of the controller via LPV control lines 18 to bring the working chamber out of fluid communication with the low pressure manifold. Alternative electronically controllable valves may be employed, such as normally closed solenoid opened valves.

The working chambers are each further associated with High Pressure Valves (HPV) 20 in the form of pressure actuated delivery valves. The HPVs face outwards from the working chambers and are operable to seal off a channel extending from the working chamber to a high pressure manifold 22, which functions as a net source or sink of fluid in use and may connect one or several working chambers, or indeed all as is shown here, to a high pressure port 24. The HPVs function as normally-closed pressuring-opening check valves which open passively when the pressure within the working chamber exceeds the pressure within the high pressure manifold. The HPVs may also function as normally-closed solenoid opened check valves which the controller may selectively hold open via HPV control lines 26 once that HPV is opened by pressure within the associated working chamber. The HPV may additionally be openable under the control of the controller when there is pressure in the high pressure manifold but not in the working chamber, or may be partially openable. A pressure relief valve 28 may protect the fluid working machine from damage.

As well as determining whether or not to close or hold open the LPVs or HPVs on a cycle by cycle basis in the manner of the prior art, the controller is operable to vary the precise phasing of the closure of the LPVs and HPVs with respect to the varying working chamber volume. Arrows on the ports 17,24 indicate fluid flow in the pumping mode; in the motoring mode the flow is reversed.

Figure 2:
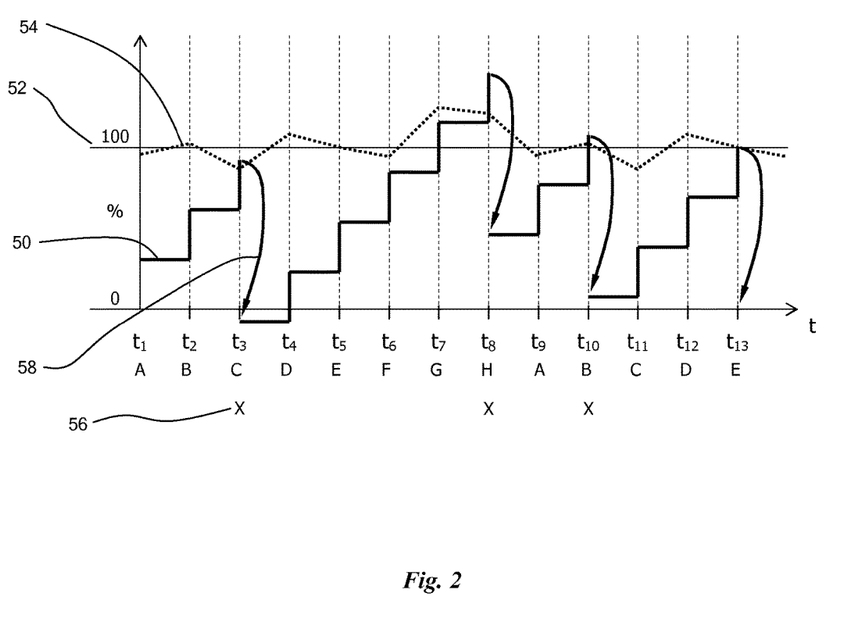
FIG. 2 illustrates the progression of an algorithm implementing the invention.

FIG. 2 shows the operation of an algorithm that implements the invention, and proceeds as follows. At each timestep t1 to t13 (falling at points of maximum volume of successive working chambers A through H) a register increments by a value representing the instantaneous displacement demand of the pump 1, the displacement demand being related to the required torque, pressure or flow in the usual manner. The register value is shown as trace 50. In machines of the prior art, when the register reaches the basic threshold 52 (typically equivalent to 100% of the volume of one working chamber) the controller 12 will activate the valves 14,20 of the corresponding working chamber to pump (or motor) a quantity of fluid. At that time the volume of fluid pumped (or motored) is subtracted from the register and the accumulation begins at a lower level at the next timestep. In this way any required flow can be produced from a sequence of working chamber activations.

The method of this invention provides for a varying secondary parameter to modify the basic threshold 52 to produce an adjusted threshold shown as trace 54, and representing the suitability for use of a working chamber relative to other working chambers. Thus, the machine according to this invention and example would activate working chamber C at t3 (indicated by mark 56), a particularly suitable time, compared to the previously known machines which would activate working chamber D at time t4, a less suitable time. The register is then decremented 58 to a new level. The neutrality of time t5 is reflected in that the basic and adjusted thresholds are very similar there. At t7 the previously known machines would have activated working chamber G due to the register value 50 exceeding the basic threshold 52, but this is a particularly unsuitable working chamber and so the secondary parameter raises the adjusted threshold. The working chamber H is instead activated at the delayed time t8.

In this manner the invention can favour or tend to avoid certain working chambers, based on any suitable secondary parameter that indicates their suitability for use, so as to vary the timing of displacement while maintaining the same average throughput of fluid.

Where the fluid working machine has multiple working chambers available for use at any given time (for example a multi-eccentric machine with two or more planes of cylinders spaced apart axially along the length of the crankshaft, or a machine having a multi-lobed cam), the algorithm may use a different adjusted threshold for each of those working chambers for which a decision is being made, at each timestep, for example to favour one over another.

The invention can be used to evenly distribute wear or fatigue amongst the working chambers A to H of the pump/motor 1. The adjusted threshold could be calculated from an estimate by the controller of the historical wear incurred on the working chamber. The historical wear prediction might be simply the historical number of times working chamber has been used previously. Alternatively the algorithm may predict wear by estimating or measuring the amount of wear incurred under the specific operating conditions at the time of the working chamber use, for example weighting more strongly or only accounting for cylinder use at high or low shaft speeds, high or low pressures, high or low temperatures or any other factor or combination of factors related to wear. The algorithm could separately account for wear in different components associated with one working chamber, for example the valves, piston or cylinder, using different prediction measures for each.

The adjusted threshold can be adjusted for a group of working chambers together, due to historical wear. In a multi-eccentric machine with two or more planes of cylinders spaced apart axially along the length of the crankshaft, the controller may account for wear of the eccentrics, and change the adjusted threshold of all working chambers associated with each eccentric. In a machine having a multi-lobed cam, the controller may account for wear of each lobe, and change the adjusted threshold of each working chamber temporarily associated therewith.

While the description has so far assumed that the basic threshold is adjusted to reflect past events, it is possible and advantageous in some situations for the adjusted threshold to represent or model the future situation under the scenario that a certain working chamber is in fact activated or not activated.

Figure 3:
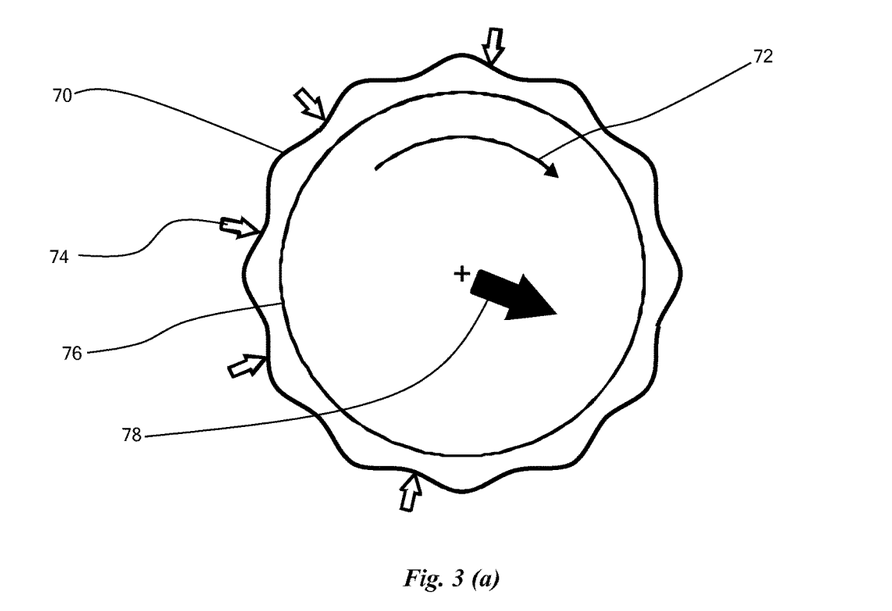
FIG. 3 shows the use of the invention to reduce unbalanced forces in a ring cam fluid working machine.

FIG. 3 (*a*) shows a cam ring 70 for the pump of a hydraulic wind turbine transmission comprising a high torque roller-piston pump and a fast-rotating hydraulic motor. In such a roller-piston pump the rollers (not shown) roll on the cam ring 70 and are connected to pistons (also not shown) which in turn cycle slidingly inside cylinders to together form working chambers analogous to those in the fluid working machine of FIG. 1. As the cam ring rotates in direction 72, the controller controls the pressurisation of the working chambers in the manner previously described (i.e. through the activation of low and high pressure valves with reference to a shaft position sensor), and therefore controls the application of forces 74 by the rollers acting on the cam. A bearing 76 is required to hold the cam in place against the net force 78.

Machines controlled according to the methods of the prior art may easily produce configurations like that shown in FIG. 3 *a*), in which many working chambers on one side of the cam have been activated but few on the opposite side. This creates a large net force 78, which may unnecessarily wear, distort or even destroy the bearing 76.

FIG. 3 (*b*) shows the behaviour of a machine having the benefit of the present invention, in which a secondary parameter which predicts the magnitude of the net force on the bearing should a working chamber in question be activated adjusts the basic threshold. A pump according to the invention, at the moment of deciding which working chambers to activate, calculates, for each possible working chamber or combination thereof that might be activated to fulfil the current demand, the peak magnitude of the net force that would result over the next working chamber volume cycle, and thus chooses to activate that working chamber or those chambers in combination which produces the smallest net force, or the first working chamber found that produces a net force that falls under a certain threshold. The net force might be calculated from the working chamber bore size and the high pressure manifold pressure, as well as the geometric position of each working chamber.

Instead of the peak magnitude of the net force, the mean or some other measure could be used. Instead of a horizon of one working chamber cycle, a longer or shorter horizon could be used. The method of the invention might therefore cause the fluid working machine to activate the working chambers shown in FIG. 3 (*b*), to produce a smaller net force 80 on the bearing 76 than in FIG. 3 (*a*).

Figure 4:
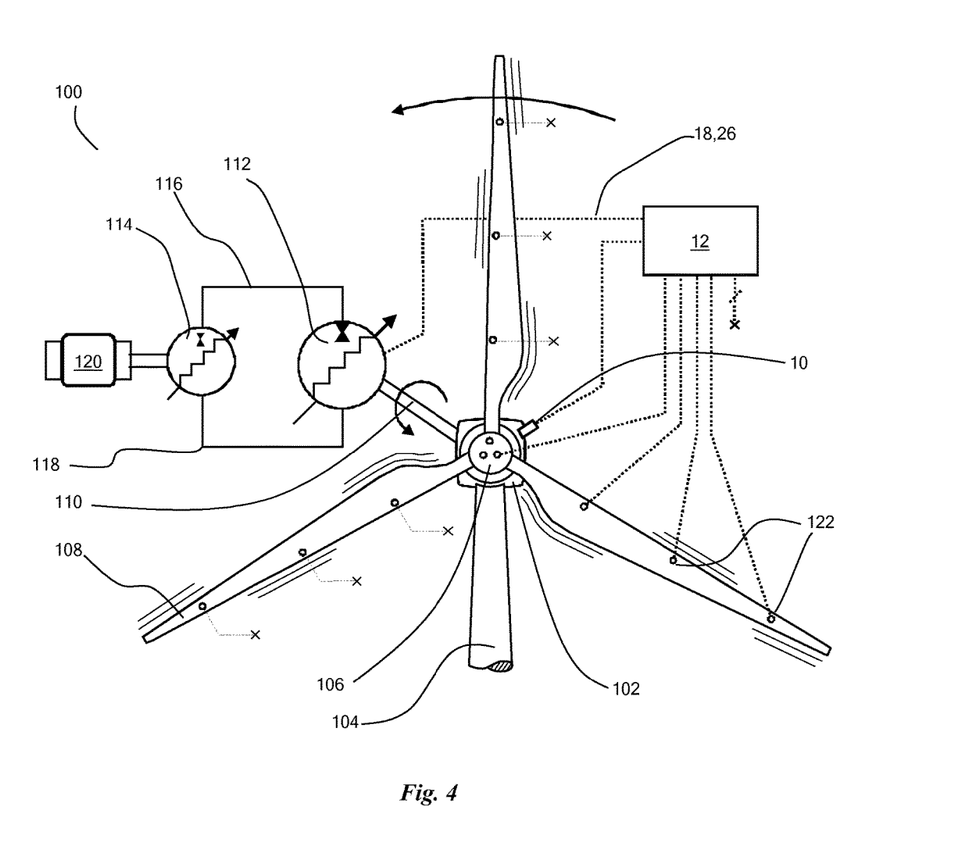
FIG. 4 shows the use of the invention to eliminate structural vibration in a wind turbine generator.

FIG. 4 shows a Wind Turbine Generator (WTG, 100, acting as the power absorbing structure) comprising a nacelle 102 rotatably mounted to a tower 104 and having mounted thereon a hub 106 supporting three blades 108. The hub is connected via shaft 110 (shown schematically) to a hydraulic wind turbine transmission comprising a high torque roller-piston ring cam pump 112 and a fast-rotating motor 114, fluidically connected to each other by high pressure line 116 and low pressure line 118. The pump and motor are preferably of the type described with reference to FIG. 1. The terms pump and motor indicate their most common operation in the WTG and do not necessarily indicate a restriction to operate only in those modes. The high 116 and low pressure 118 lines connect to the high 24 and low 17 pressure ports respectively. The motor 114 is coupled to a synchronous or other electric generator or motor 120, for example to provide power into an electricity network or to receive power therefrom.

A controller 12 controls the valves of at least the pump, using input from shaft speed sensor 10 and from a plurality of sensors 122. The sensors are accelerometers, strain gauges and relative position sensors, and are used to inform the controller of the current structural condition of the WTG, for example undesirable vibrations in the tower or blades, or resonance conditions.

In use the WTG may benefit from the invention by using the algorithm described above with reference to FIG. 2. At each timestep the controller (acting as the computer model of the sixth aspect) predicts the future motion (structural response) of the WTG by convolving the time response of a proposed working chamber with the known characteristic response of the WTG pump, hydraulic system, tower and blades. Such a prediction also uses the current motion (structural condition) from sensors 122. Certain parameters of the motion, for example whether measurements are exceeded or the relative scale of a plurality of measurements, are used to calculate a secondary parameter to produce the adjusted threshold for each potential working chamber, from the basic threshold, and thence to select the volume displaced by a working chamber based on its suitability compared to other working chambers.

In this manner the WTG, compared to WTGs driving pumps controlled according to the prior art, has reduced structural vibration, allowing it to last longer, survive greater hardship, or be built lighter and more cost effectively than previously. The motion of two parts of the WTG may be restored to a desirable balanced condition by virtue of the invention.

Figure 5:
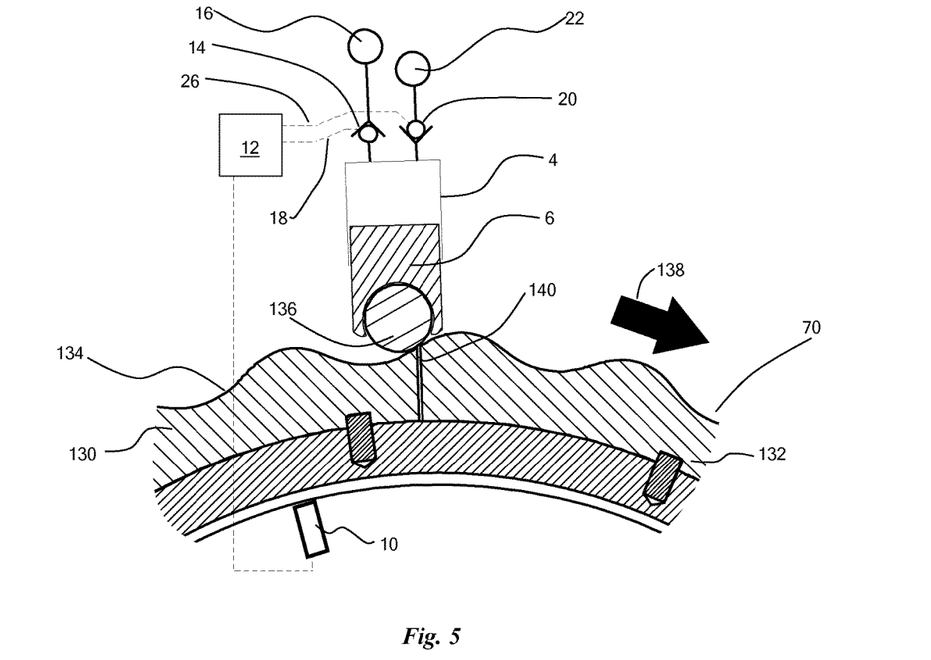
FIG. 5 shows the use of the invention to avoid damage caused by rollers being activated over segment boundaries in a segmented ring cam motor.

FIG. 5 shows a portion of a roller piston fluid working machine showing the cam ring 70 comprised of two or more segments 130,132, a wave-shaped surface 134 of which drives a plurality of rollers 136 to cyclically drive a piston 6 in a cylinder 4. The controller 12 controls active low pressure valves 14, and optionally controls high pressure valves 20, through control lines 18,26, to fluidically connect or isolate the working chamber from low 16 and high 22 pressure manifolds respectively. The controller has a shaft position sensor 10 to measure the shaft position as it rotates in direction 138, and is therefore aware of segment boundaries 140. The segment boundaries are typically arranged so that the working chambers are not pressurised when the rollers roll over them in a preferred mode of operation or direction, i.e. the rollers are always unloaded when they cross the segment boundaries. For example in the machine shown in FIG. 5, which rotates in direction 138 and is preferably operated as a pump, the rollers cross the segment boundaries on the expansion stroke of the associated working chamber.

In use, the fluid working machine may be required to operate at least some of the time as a motor, for example for maintenance purposes, or as a pump in the reverse direction. In this case, machines of the prior art would activate working chambers so that the rollers cross the segment boundary under load, causing damage and wear. However, a machine employing the method of the invention will use a secondary parameter, derived from the shaft position sensor and predicting whether an activated working chamber would cause a loaded roller to cross a segment boundary, to select which working chambers to activate, and so avoid damage and wear while maintaining the desired output over time.

Many other applications exist which will benefit from the invention, including those listed in the introduction.

The invention claimed is:

1. A method of operating a fluid-working machine comprising a plurality of working chambers of cyclically varying volume, each said working chamber operable to displace a volume of working fluid which is selectable for each cycle of working chamber volume, the method comprising:
    selecting the volume of working fluid displaced by one or more said working chambers during each cycle of working chamber volume, and displacing, by one or more said working chambers, the selected volume of working fluid to carry out a working function responsive to a received demand signal,
    wherein
    selecting the volume of working fluid displaced by a first working chamber during a cycle of working chamber volume takes into account suitability of said first working chamber to displace fluid to carry out the working function, and
    the suitability which is taken into account is selected from the group consisting of (a) a parameter determined by a historical amount of use of the one or more working chambers, (b) a parameter determined by a measurement or prediction of a net force applied to a rotatable shaft of said fluid-working machine by fluid-pressurized working chambers, and (c) a parameter determined responsive to measuring or predicting a motion of a mechanical component, said motion being influenced by said fluid-working machine,
    wherein said selecting the volume of working fluid displaced by the first working chamber during the cycle of working chamber volume further takes into account the relative suitability of at least one second working chamber to displace fluid to carry out the working function,
    wherein each working chamber is operable on each cycle of working chamber volume to carry out an active cycle in which the chamber makes a net displacement of working fluid or an idle cycle in which the chamber makes substantially no net displacement of working fluid, and
    wherein, on at least one occasion, the first working chamber carries out an active cycle instead of an idle cycle as a result of the unsuitability of the second working chamber.

2. The method according to claim 1, the fluid-working machine comprising a controller, and at least one valve associated with each working chamber operable to regulate the connection of the respective working chamber to a low pressure manifold and a high pressure manifold, at least one valve associated with each working chamber being electronically controllable under the active control of the controller to select the volume of working fluid displaced during each cycle of working chamber volume,
    wherein the controller receives the received demand signal and actively controls the electronically controllable valves, in phased relationship to cycles of working chamber volume, to select the displacement of fluid by one or more of the working chambers on each cycle of working chamber volume, responsive to the received demand signal.

3. A method of operating a fluid-working machine comprising a plurality of working chambers of cyclically varying volume, each said working chamber operable to displace a volume of working fluid which is selectable for each cycle of working chamber volume, the method comprising:
- selecting the volume of working fluid displaced by one or more said working chambers during each cycle of working chamber volume, and displacing, by one or more said working chambers, the selected volume of working fluid to carry out a working function responsive to a received demand signal,
- wherein
- selecting the volume of working fluid displaced by a first working chamber during a cycle of working chamber volume takes into account suitability of said first working chamber to displace fluid to carry out the working function, and
- the suitability which is taken into account is selected from the group consisting of (a) a parameter determined by a historical amount of use of the one or more working chambers, (b) a parameter determined by a measurement or prediction of a net force applied to a rotatable shaft of said fluid-working machine by fluid-pressurized working chambers, and (c) a parameter determined responsive to measuring or predicting a motion of a mechanical component, said motion being influenced by said fluid-working machine,
- wherein said selecting the volume of working fluid displaced by the first working chamber during the cycle of working chamber volume further takes into account the relative suitability of at least one second working chamber to displace fluid to carry out the working function,
- wherein each working chamber is operable on each cycle of working chamber volume to carry out an active cycle in which the chamber makes a net displacement of working fluid or an idle cycle in which the chamber makes substantially no net displacement of working fluid, and
- wherein, on at least one occasion, the first working chamber carries out an active cycle instead of an idle cycle as a result of having greater suitability than the second working chamber.

4. The method according to claim 3, the fluid-working machine comprising a controller, and at least one valve associated with each working chamber operable to regulate the connection of the respective working chamber to a low pressure manifold and a high pressure manifold, at least one valve associated with each working chamber being electronically controllable under the active control of the controller to select the volume of working fluid displaced during each cycle of working chamber volume,
- wherein the controller receives the received demand signal and actively controls the electronically controllable valves, in phased relationship to cycles of working chamber volume, to select the displacement of fluid by one or more of the working chambers on each cycle of working chamber volume, responsive to the received demand signal.

5. A method of operating a fluid-working machine comprising a plurality of working chambers of cyclically varying volume, each said working chamber operable to displace a volume of working fluid which is selectable for each cycle of working chamber volume, the method comprising:
- selecting the volume of working fluid displaced by one or more said working chambers during each cycle of working chamber volume, and displacing, by one or more said working chambers, the selected volume of working fluid to carry out a working function responsive to a received demand signal,
- wherein
- selecting the volume of working fluid displaced by a first working chamber during a cycle of working chamber volume takes into account suitability of said first working chamber to displace fluid to carry out the working function, and
- the suitability which is taken into account is selected from the group consisting of (a) a parameter determined by a historical amount of use of the one or more working chambers, (b) a parameter determined by a measurement or prediction of a net force applied to a rotatable shaft of said fluid-working machine by fluid-pressurized working chambers, and (c) a parameter determined responsive to measuring or predicting a motion of a mechanical component, said motion being influenced by said fluid-working machine,
- wherein said selecting the volume of working fluid displaced by the first working chamber during the cycle of working chamber volume further takes into account the relative suitability of at least one second working chamber to displace fluid to carry out the working function, and
- wherein the volume of working fluid displaced by said at least one second working chambers is selected to carry out the working function responsive to the received demand signal, taking into account the selected volume of working fluid displaced by said first working chamber.

6. The method according to claim 5, the fluid-working machine comprising a controller, and at least one valve associated with each working chamber operable to regulate the connection of the respective working chamber to a low pressure manifold and a high pressure manifold, at least one valve associated with each working chamber being electronically controllable under the active control of the controller to select the volume of working fluid displaced during each cycle of working chamber volume,
- wherein the controller receives the received demand signal and actively controls the electronically controllable valves, in phased relationship to cycles of working chamber volume, to select the displacement of fluid by one or more of the working chambers on each cycle of working chamber volume, responsive to the received demand signal.

7. A method of operating a fluid-working machine comprising a plurality of working chambers of cyclically varying volume, each said working chamber operable to displace a volume of working fluid which is selectable for each cycle of working chamber volume, the method comprising:
- selecting the volume of working fluid displaced by one or more said working chambers during each cycle of working chamber volume, and displacing, by one or more said working chambers, the selected volume of working fluid to carry out a working function responsive to a received demand signal,
- wherein
- selecting the volume of working fluid displaced by a first working chamber during a cycle of working chamber volume takes into account suitability of said first working chamber to displace fluid to carry out the working function, the suitability which is taken into account is selected from the group consisting of (a) a parameter determined by a historical amount of use of the one or more working chambers, (b) a parameter determined by a measurement or prediction of a net force applied to a rotatable shaft of said fluid-working machine by fluid-pressurized working chambers, and (c) a parameter determined responsive to measuring or predicting a motion of a mechanical component, said motion being influenced by said fluid-working machine, wherein said selecting the volume of working fluid displaced by the first working chamber during the cycle of working chamber volume further takes into account the relative suitability of at least one second working chamber to displace fluid to carry out the working function, and wherein the suitability is the parameter determined by the historical amount of use of the one or more working chambers.

8. The method according to claim 7, the fluid-working machine comprising a controller, and at least one valve associated with each working chamber operable to regulate the connection of the respective working chamber to a low pressure manifold and a high pressure manifold, at least one valve associated with each working chamber being electronically controllable under the active control of the controller to select the volume of working fluid displaced during each cycle of working chamber volume, wherein the controller receives the received demand signal and actively controls the electronically controllable valves, in phased relationship to cycles of working chamber volume, to select the displacement of fluid by one or more of the working chambers on each cycle of working chamber volume, responsive to the received demand signal.

9. A method of operating a fluid-working machine comprising a plurality of working chambers of cyclically varying volume, each said working chamber operable to displace a volume of working fluid which is selectable for each cycle of working chamber volume, the method comprising:

selecting the volume of working fluid displaced by one or more said working chambers during each cycle of working chamber volume, and displacing, by one or more said working chambers, the selected volume of working fluid to carry out a working function responsive to a received demand signal, wherein selecting the volume of working fluid displaced by a first working chamber during a cycle of working chamber volume takes into account suitability of said first working chamber to displace fluid to carry out the working function, the suitability which is taken into account is selected from the group consisting of (a) a parameter determined by a historical amount of use of the one or more working chambers, (b) a parameter determined by a measurement or prediction of a net force applied to a rotatable shaft of said fluid-working machine by fluid-pressurized working chambers, and (c) a parameter determined responsive to measuring or predicting a motion of a mechanical component, said motion being influenced by said fluid-working machine, and the suitability is the parameter determined by the measurement or prediction of the net force applied to the rotatable shaft of said fluid-working machine by the fluid-pressurized working chambers.

10. The method according to claim 9, the fluid-working machine comprising a controller, and at least one valve associated with each working chamber operable to regulate the connection of the respective working chamber to a low pressure manifold and a high pressure manifold, at least one valve associated with each working chamber being electronically controllable under the active control of the controller to select the volume of working fluid displaced during each cycle of working chamber volume, wherein the controller receives the received demand signal and actively controls the electronically controllable valves, in phased relationship to cycles of working chamber volume, to select the displacement of fluid by one or more of the working chambers on each cycle of working chamber volume, responsive to the received demand signal.

11. A method of operating a fluid-working machine comprising a plurality of working chambers of cyclically varying volume, each said working chamber operable to displace a volume of working fluid which is selectable for each cycle of working chamber volume, the method comprising:

selecting the volume of working fluid displaced by one or more said working chambers during each cycle of working chamber volume, and displacing, by one or more said working chambers, the selected volume of working fluid to carry out a working function responsive to a received demand signal, wherein selecting a volume of working fluid displaced by a first working chamber among the plurality of working chambers during a cycle of working chamber volume takes into account a historical amount of use of the one or more working chambers.

12. The method according to claim 11, the fluid-working machine comprising a controller, and at least one valve associated with each working chamber operable to regulate the connection of the respective working chamber to a low pressure manifold and a high pressure manifold, at least one valve associated with each working chamber being electronically controllable under the active control of the controller to select the volume of working fluid displaced during each cycle of working chamber volume, wherein the controller receives the received demand signal and actively controls the electronically controllable valves, in phased relationship to cycles of working chamber volume, to select the displacement of fluid by one or more of the working chambers on each cycle of working chamber volume, responsive to the received demand signal.

13. A method of operating a fluid-working machine comprising a plurality of working chambers of cyclically varying volume, each said working chamber operable to displace a volume of working fluid which is selectable for each cycle of working chamber volume, the method comprising:

selecting the volume of working fluid displaced by one or more said working chambers during each cycle of working chamber volume, and displacing, by one or more said working chambers, the selected volume of working fluid to carry out a working function responsive to a received demand signal, wherein selecting a volume of working fluid displaced by a first working chamber among the plurality of working chambers during a cycle of working chamber volume takes into account a measurement or prediction of a net force applied to a rotatable shaft of said fluid-working machine by the fluid-pressurized working chambers.

14. The method according to claim 13, the fluid-working machine comprising a controller, and at least one valve associated with each working chamber operable to regulate the connection of the respective working chamber to a low pressure manifold and a high pressure manifold, at least one valve associated with each working chamber being electronically controllable under the active control of the controller to select the volume of working fluid displaced during each cycle of working chamber volume,
  wherein the controller receives the received demand signal and actively controls the electronically controllable valves, in phased relationship to cycles of working chamber volume, to select the displacement of fluid by one or more of the working chambers on each cycle of working chamber volume, responsive to the received demand signal.

15. A fluid working machine comprising:
a plurality of working chambers of cyclically varying volume, and
a controller,
wherein
each said working chamber is operable to displace a volume of working fluid which is selectable by the controller on each cycle of working chamber volume,
the controller is operable to select the volume of working fluid displaced by one or more said working chambers on each cycle of working chamber volume, and displace, by one or more said working chambers, the selected volume of working fluid to carry out a working function responsive to a received demand signal,
wherein
the controller is operable to select the volume of working fluid displaced by a first working chamber during a cycle of working chamber volume by taking into account suitability of said first working chamber to displace fluid to carry out the working function, and
the suitability which is taken into account is selected from the group consisting of (a) a parameter determined by a historical amount of use of the one or more working chambers, (b) a parameter determined by a measurement or prediction of a net force applied to a rotatable shaft of said fluid-working machine by fluid-pressurized working chambers, and (c) a parameter determined responsive to measuring or predicting a motion of a mechanical component, said motion being influenced by said fluid-working machine,
wherein the controller is operable to select the volume of working fluid displaced by the first working chamber during the cycle of working chamber volume by further taking into account the relative suitability of at least one second working chamber to displace fluid to carry out the working function,
wherein each working chamber is operable on each cycle of working chamber volume to carry out an active cycle in which the chamber makes a net displacement of working fluid or an idle cycle in which the chamber makes substantially no net displacement of working fluid, and
wherein, on at least one occasion, the first working chamber carries out an active cycle instead of an idle cycle as a result of (i) the unsuitability of the second working chamber or (ii) having greater suitability than the second working chamber.

16. A fluid working machine comprising:
a plurality of working chambers of cyclically varying volume, and
a controller,
wherein
each said working chamber is operable to displace a volume of working fluid which is selectable by the controller on each cycle of working chamber volume,
the controller is operable to select the volume of working fluid displaced by one or more said working chambers on each cycle of working chamber volume, and displace, by one or more said working chambers, the selected volume of working fluid to carry out a working function responsive to a received demand signal,
wherein
the controller is operable to select the volume of working fluid displaced by a first working chamber during a cycle of working chamber volume by taking into account suitability of said first working chamber to displace fluid to carry out the working function, and
the suitability which is taken into account is selected from the group consisting of (a) a parameter determined by a historical amount of use of the one or more working chambers, (b) a parameter determined by a measurement or prediction of a net force applied to a rotatable shaft of said fluid-working machine by fluid-pressurized working chambers, and (c) a parameter determined responsive to measuring or predicting a motion of a mechanical component, said motion being influenced by said fluid-working machine,
wherein the controller is operable to select the volume of working fluid displaced by the first working chamber during the cycle of working chamber volume, by further taking into account the relative suitability of at least one second working chamber to displace fluid to carry out the working function, and
wherein the controller is operable to select the volume of working fluid displaced by said at least one second working chambers to carry out the working function responsive to the received demand signal, by taking into account the selected volume of working fluid displaced by said first working chamber.

17. A fluid working machine comprising:
a plurality of working chambers of cyclically varying volume, and
a controller,
wherein
each said working chamber is operable to displace a volume of working fluid which is selectable by the controller on each cycle of working chamber volume,
the controller is operable to select the volume of working fluid displaced by one or more said working chambers on each cycle of working chamber volume, and displace, by one or more said working chambers, the selected volume of working fluid to carry out a working function responsive to a received demand signal,
wherein
the controller is operable to select the volume of working fluid displaced by a first working chamber during a cycle of working chamber volume by taking into account suitability of said first working chamber to displace fluid to carry out the working function, and
the suitability which is taken into account is selected from the group consisting of (a) a parameter determined by a historical amount of use of the one or more working chambers, (b) a parameter determined by a measurement or prediction of a net force applied to a rotatable shaft of said fluid-working machine by fluid-pressurized working chambers, and (c) a parameter determined responsive to measuring or predicting a motion of a mechanical component, said motion being influenced by said fluid-working machine, wherein the controller is operable to select the volume of working fluid displaced by the first working chamber during the cycle of working chamber volume, by further taking into account the relative suitability of at least one second working chamber to displace fluid to carry out the working function, and wherein the suitability is the parameter determined by (i) the historical amount of use of the one or more working chambers or (ii) the measurement or prediction of the net force applied to the rotatable shaft of said fluid-working machine by the fluid-pressurized working chambers.

18. A fluid working machine comprising:
a plurality of working chambers of cyclically varying volume, and
a controller,
wherein
each said working chamber is operable to displace a volume of working fluid which is selectable by the controller on each cycle of working chamber volume,
the controller is operable to select the volume of working fluid displaced by one or more said working chambers during each cycle of working chamber volume, and displace, by one or more said working chambers, the selected volume of working fluid to carry out a working function responsive to a received demand signal,
wherein the controller is operable to select a volume of working fluid displaced by a first working chamber among the plurality of working chambers during a cycle of working chamber volume by taking into account (i) a historical amount of use of the one or more working chambers or (ii) a measurement or prediction of a net force applied to a rotatable shaft of said fluid-working machine by the fluid-pressurized working chambers.

19. A non-transitory computer readable storage medium comprising computer program code which, when executed on a fluid-working machine controller, is configured to operate a fluid-working machine to carry out a control method, said fluid-working machine comprising a plurality of working chambers of cyclically varying volume, each said working chamber operable to displace a volume of working fluid which is selectable for each cycle of working chamber volume, the control method comprising:
selecting the volume of working fluid displaced by one or more said working chambers during each cycle of working chamber volume, and displacing, by one or more said working chambers, the selected volume of working fluid to carry out a working function responsive to a received demand signal,
wherein
selecting the volume of working fluid displaced by a first working chamber during a cycle of working chamber volume takes into account suitability of said first working chamber to displace fluid to carry out the working function, and
the suitability which is taken into account is selected from the group consisting of (a) a parameter determined by a historical amount of use of the one or more working chambers, (b) a parameter determined by a measurement or prediction of a net force applied to a rotatable shaft of said fluid-working machine by fluid-pressurized working chambers, and (c) a parameter determined responsive to measuring or predicting a motion of a mechanical component, said motion being influenced by said fluid-working machine,
wherein said selecting the volume of working fluid displaced by the first working chamber during the cycle of working chamber volume further takes into account the relative suitability of at least one second working chamber to displace fluid to carry out the working function,
wherein each working chamber is operable on each cycle of working chamber volume to carry out an active cycle in which the chamber makes a net displacement of working fluid or an idle cycle in which the chamber makes substantially no net displacement of working fluid, and
wherein, on at least one occasion, the first working chamber carries out an active cycle instead of an idle cycle as a result of the unsuitability of the second working chamber.

* * * * *